United States Patent
Nakase

(10) Patent No.: US 10,623,062 B2
(45) Date of Patent: Apr. 14, 2020

(54) POWER FEEDING DEVICE AND POWER FEEDING METHOD

(71) Applicant: Funai Electric Co., Ltd., Osaka (JP)

(72) Inventor: Takafumi Nakase, Daito (JP)

(73) Assignee: Funai Electric Co., LTD., Osaka (JP)

( * ) Notice: Subject to any disclaimer, the term of this patent is extended or adjusted under 35 U.S.C. 154(b) by 148 days.

(21) Appl. No.: 15/786,719

(22) Filed: Oct. 18, 2017

(65) Prior Publication Data

US 2018/0109293 A1   Apr. 19, 2018

(30) Foreign Application Priority Data

Oct. 18, 2016   (JP) .................................. 2016-204418

(51) Int. Cl.
| | |
|---|---|
| *H04B 5/00* | (2006.01) |
| *H02J 50/80* | (2016.01) |
| *H02J 50/90* | (2016.01) |
| *H02J 50/40* | (2016.01) |

(52) U.S. Cl.
CPC ............ *H04B 5/0037* (2013.01); *H02J 50/40* (2016.02); *H02J 50/80* (2016.02); *H02J 50/90* (2016.02)

(58) Field of Classification Search
None
See application file for complete search history.

(56) References Cited

U.S. PATENT DOCUMENTS

| | | | | |
|---|---|---|---|---|
| 2010/0248622 A1* | 9/2010 | Lyell Kirby | ............ | H02J 7/025 455/41.1 |
| 2012/0235636 A1* | 9/2012 | Partovi | ................... | H02J 7/025 320/108 |
| 2014/0028093 A1* | 1/2014 | Aikawa | ................... | H02J 7/025 307/11 |
| 2016/0336804 A1* | 11/2016 | Son | ....................... | H02J 7/0027 |
| 2017/0155284 A1* | 6/2017 | Takahashi | ............... | H02J 50/30 |

FOREIGN PATENT DOCUMENTS

| | | |
|---|---|---|
| JP | 2015-39271 A | 2/2015 |
| WO | 2015/102454 A1 | 7/2015 |

OTHER PUBLICATIONS

Extended European Search Report issued in European Application No. 17196917.3 dated Mar. 14, 2018 (7 pages).

\* cited by examiner

*Primary Examiner* — Jared Fureman
*Assistant Examiner* — Joel Barnett
(74) *Attorney, Agent, or Firm* — Osha Liang LLP

(57) ABSTRACT

A power feeding device includes a power feeder that wirelessly feeds power to one of a plurality of power receivers, a transceiver that communicates with the plurality of power receivers, and a controller that causes, when the transceiver receives a plurality of signals from two or more of the plurality of power receivers, the power feeder to suspend the feeding of power to the one of the plurality of power receivers for a predetermined period.

15 Claims, 7 Drawing Sheets

POWER FEEDING DEVICE AND POWER FEEDING METHOD

BACKGROUND OF THE INVENTION

Technical Field

The present invention relates to a power feeding device and a power feeding method that wirelessly feeds power to a power receiving device.

Related Art

A wireless power feeding system is known that wirelessly (without contacting) feeds power from a power feeding device to a power receiving device (for example, see patent literature 1). This wireless power feeding system feeds power from the power feeding device to the power receiving device by generating induced electromotive force to a secondary coil owned by the power receiving device, due to a flux change generated in a first coil owned by the power feeding device.

Furthermore, in the wireless power feeding system described above, wireless communication is carried out between the power feeding device and the power receiving device by, for example, Bluetooth (registered trademark). The power feeding device controls the feeding of power to the power receiving device based on power receiving information obtained via wireless communication from the power receiving device.

PATENT LITERATURE

[Patent Literature 1] Japanese Unexamined Patent Application Publication No. 2015-39271

SUMMARY

In the conventional power feeding device described above, for example, in a state having two power feeding devices arranged in a line, a power receiving device may be installed at almost the same time to each of the two power feeding devices. At this time, because the wireless communication distance is generally longer than the wireless power feeding distance, a phenomenon may occur wherein each power feeding device obtains power receiving information from a power receiving device that is different from the power receiving device that is its pair (a so-called cross connection). As a result, each power feeding device cannot reliably feed power to the power receiving device, which is its pair.

One or more embodiments of the present invention provides a power feeding device and a power feeding method that can reliably feed power to a power receiving device.

The power feeding device according to one or more embodiments of the present invention is provided with a power feeding unit that wirelessly feeds power to a power receiving device, a communication unit that carries out communication between the power receiving device, and a control unit that controls both the power feeding unit and the communication unit, wherein the control unit stops the feeding of power to the power feeding unit for a predetermined period and restarts the feeding of power to the power feeding unit based on the communication unit receiving a signal from the power receiving device.

According to one or more embodiments of the invention, the control unit stops and restarts the feeding of power to the power receiving device when the communication unit receives a signal from the power receiving device to which power is to be fed and a signal from another power receiving device to which power is not to be fed. By this, the communication unit only receives a signal from the power receiving device to which power is to be fed by stopping the feeding of power to the other power receiving device when the feeding of power to the power receiving device is restarted. As a result, the power feeding device can reliably receive power receiving information from the power receiving device to which power is to be fed, and can reliably carry out feeding of power to the power receiving device based on this power receiving information.

For example, in the power feeding device according to one or more embodiments of the present invention, the control unit may be configured to set a time period specific to the power feeding device as the predetermined period.

According to one or more embodiments of the invention, because the predetermined period is a period specific to the power feeding device, the period for stopping the feeding of power can be made to be different by each of the plurality of the power feeding devices when a plurality of the power feeding device is arranged in a line. As a result, the timing for restarting the feeding of power to the power receiving device can be made different in each of the plurality of the power feeding device.

For example, in the power feeding device according to one or more embodiments of the present invention, the control unit may be configured to set the predetermined period based on a random number specific to the power feeding device.

According to one or more embodiments of the invention, the predetermined period can be set using a simple method.

For example, in the power feeding device according to one or more embodiments of the present invention, the control unit may be configured to generate the random number based on an address assigned to the power feeding device.

According to one or more embodiments of the invention, the predetermined period can be set using a simple method.

For example, in the power feeding device according to one or more embodiments of the present invention, the signal may be configured to include at least one of an address, an ID, or a received signal strength indicator.

According to one or more embodiments of the invention, the feeding of power to the power feeding unit can be stopped for a predetermined period based on at least one of an address, an ID, or a received signal strength indicator.

For example, in the power feeding device according to one or more embodiments of the present invention, the control unit may be configured to control the power feeding unit based on the signal after restarting.

According to one or more embodiments of the invention, the power feeding unit can be reliably controlled based on a signal after restarting.

For example, in the power feeding device according to one or more embodiments of the present invention, it can be configured so that the power feeding unit wirelessly feeds power to each of the plurality of the power receiving device, and the control unit repeats the stopping and restarting of power feeding to the power feeding unit a plurality of times based on the communication unit receiving the signal from each of the plurality of the power receiving device, and determines that the plurality of the power receiving device is installed on the power feeding device based on the communication unit receiving the same plurality of signals.

According to one or more embodiments of the invention, it can be easily determined that all of the plurality of the power receiving device are installed on the power receiving device when the communication unit receives the plurality of signals from each of the plurality of the power receiving device.

For example, in the power feeding device according to one or more embodiments of the present invention, the control unit may be configured to set power feeding conditions for the power feeding unit to feed power to each of the plurality of the power receiving device based on the plurality of signals from the plurality of the power receiving device received by the communication unit.

According to one or more embodiments of the invention, power can be reliably fed to each of the plurality of a power receiving device based on power feeding conditions.

For example, in the power feeding device according to one or more embodiments of the present invention, the communication unit may be further configured to communicate with a management device that manages the power feeding device, and the predetermined period may be notified to the communication unit from the management unit.

According to one or more embodiments of the invention, the control unit can stop the feeding of power to the power receiving device based on the predetermined period notified from the management device.

Furthermore, a power feeding method according to one or more embodiments of the present invention includes a step for wirelessly feeding power to a power receiving device, a step for carrying out communication between the power receiving device, and a step for stopping the feeding of power to the power receiving device for a predetermined period and restarting the feeding of power to the power receiving device based on receiving a signal from a plurality of the power receiving device.

According to one or more embodiments of the invention, the feeding of power to the power receiving device stops and restarts when a signal from the power receiving device to which power is to be fed and a signal from another power receiving device to which power is not to be fed are received. By this, only the signal from the power receiving device to which power is to be fed it is received by stopping the feeding of power to the other power receiving device when the feeding of power to the power receiving device is restarted. As a result, the power feeding device can reliably receive power receiving information from the power receiving device to which power is to be fed, and the feeding of power to the power receiving device can be reliably carried out based on this power receiving information.

One or more embodiments of the present invention can be realized not only as a power feeding device provided with these characteristic processing units, but can also be realized as a control method that has the processes executed by these characteristic processing units included in the power feeding device as its steps. Moreover, it can also be a realized as a program that makes a computer function as a characteristic processing unit included in the power feeding device, or a program that executes the characteristic steps included in the control method in a computer. It goes without saying that this kind of program can be distributed via a non-temporary recording medium that can be read by a computer such as a CD-ROM (Compact Disc-Read Only Memory), or a communications network such as the internet.

According to the power feeding device and the power feeding method in one or more embodiments of the present invention, power can be reliably fed to a power receiving device.

DETAILED DESCRIPTION

Hereinafter, one or more embodiments of the present invention will be described with reference to drawings. Note that the embodiments described below all illustrate inclusive or specific examples. The values, shapes, materials, components, disposition location and connection state of the components, and the like, are only examples, and do not limit the present invention. Furthermore, components in the embodiments below that are not described in the claims are described as optional components. Each drawing does not always strictly disclose each dimension or each dimension ratio and the like.

1-1. Summary of Wireless Power Feeding System

Figure 1:
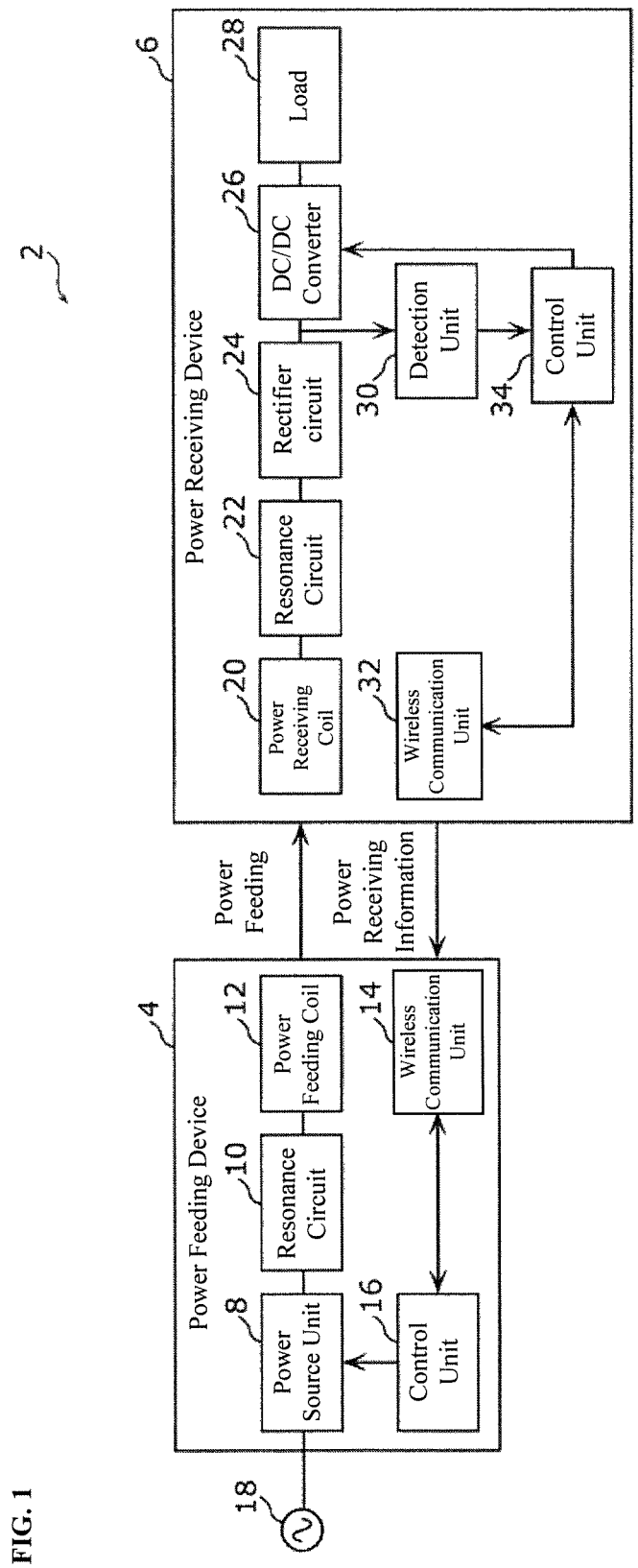
FIG. 1 is a block diagram illustrating the functional configuration of the wireless power feeding system according to one or more embodiments of the present invention.

First, a summary of a wireless power feeding system 2 according to one or more embodiments of the present invention will be described referring to FIG. 1. FIG. 1 is a block diagram illustrating the functional configuration of the wireless power feeding system 2 according to one or more embodiments of the present invention.

The wireless power feeding system 2 is a system for wirelessly (without contact) feeding power using, for example, an electromagnetic induction method. As illustrated in FIG. 1, the wireless power feeding system 2 is provided with a power feeding device 4 and a power receiving device 6 (or a power receiver).

The power feeding device 4 is a device for wirelessly feeding power to the power receiving device 6, and is, for example, a power feeding platform or the like installed on a table.

The power receiving device 6 is a device for wirelessly receiving power, and is, for example, an electronic apparatus or the like such as a smartphone or digital camera. By the power receiving device 6 being installed (mounted) on the power feeding device 4, power from the power feeding device 4 is wirelessly supplied to the power receiving device 6.

1-2. Configuration of Power Feeding Device

Next, the configuration of the power feeding device 4 according to one or more embodiments of the present invention will be described referring to FIG. 1.

As illustrated in FIG. 1, the power feeding device 4 has a power source unit 8 (one example of a power feeding unit or power feeder), a resonance circuit 10, a power feeding coil 12, a wireless communication unit 14 (one example of a communication unit or transceiver), and a control unit 16 (or a controller).

The power source unit 8 receives power from a commercial power source 18, and supplies AC power of a prescribed frequency to the resonance circuit 10.

The resonance circuit 10 resonates at a resonance frequency that is substantially the same as the prescribed frequency of the AC power supplied from the power source unit 8.

The power feeding coil 12 is a so-called primary coil that generates a magnetic field for wirelessly feeding power to the power receiving device 6, by AC power of a prescribed frequency being supplied from the power source unit 8 via the resonance circuit 10.

The wireless communication unit 14 carries out wireless communication with the power receiving device 6 based on, for example, a Bluetooth (registered trademark) Low Energy (BLE) method. The wireless communication unit 14 receives, for example, power feeding information (described later) or the like from the power receiving device 6.

The control unit 16 controls each of the power source unit 8 and the wireless communication unit 14. For example, the control unit 16 controls the voltage value of the AC power supplied by the power source unit 8 based on power receiving information received by the wireless communication unit 14. Note that the control unit 16 has a CPU (Central Processing Unit), ROM (Read Only Memory), RAM (Random Access Memory) (none of which are illustrated in the drawings) and the like. Control programs for controlling the power feeding device 4 are stored in the ROM. The CPU integrally controls the power feeding device 4 by executing the control programs stored in the ROM. The RAM is used as a temporary storage region (operation region) for various processes executed in the CPU.

1-3. Configuration of Power Receiving Device

Next, the configuration of the power receiving device 6 according to one or more embodiments of the present invention will be described referring to FIG. 1.

As illustrated in FIG. 1, the power receiving device 6 has a power receiving coil 20, a resonance circuit 22, a rectifier circuit 24, a DC/DC converter 26, a load 28, a detection unit 30, a wireless communication unit 32, and a control unit 34.

The power receiving coil 20 is a so-called secondary coil that generates AC power by induced electromotive force caused by a flux change generated by the power feeding coil 12 of the power feeding device 4.

The resonance circuit 22 resonates at a resonance frequency that is substantially the same as the resonance frequency of the resonance circuit 10 of the power feeding device 4.

The rectifier circuit 24 rectifies AC power supplied from the power receiving coil 20 via the resonance circuit 22 into DC power. The rectifier circuit 24 is configured by a bridge rectifier circuit including, for example, four diodes.

The DC/DC converter 26 steps-up or steps-down the voltage value of DC power supplied from the rectifier circuit 24 to a prescribed voltage value.

The load 28 includes a secondary battery that can be charged and discharged. The DC power supplied from the DC/DC converter 26 is charged to the load 28 as a secondary battery. Note that the load 28 may include a load other than a secondary battery that can be charged and discharged.

The detection unit 30 detects the voltage value of the DC power rectified by the rectifier circuit 24, and outputs power receiving information, which is information relating to the detected voltage value, to the control unit 34.

The wireless communication unit 32 carries out wireless communication with the power feeding device 4 based on, for example, the BLE method. The wireless communication unit 32 transmits, for example, power receiving information and the like output from the control unit 34 to the power feeding device 4.

The control unit 34 controls each of the DC/DC converter 26 and the wireless communication unit 32. For example, the control unit 34 instructs the wireless communication unit 32 to transmit power receiving information from the detection unit 30 to the power feeding device 4. Note that the control unit 34 has a CPU, ROM, RAM, and the like (none of which are illustrated in the drawings). Control programs for controlling the power receiving device 6 are stored in the ROM. The CPU integrally controls the power receiving device 6 by executing the control programs stored in the ROM. The RAM is used as a temporary storage region for various processes executed in the CPU.

1-4. Operation of the Power Feeding Device

Figure 2:
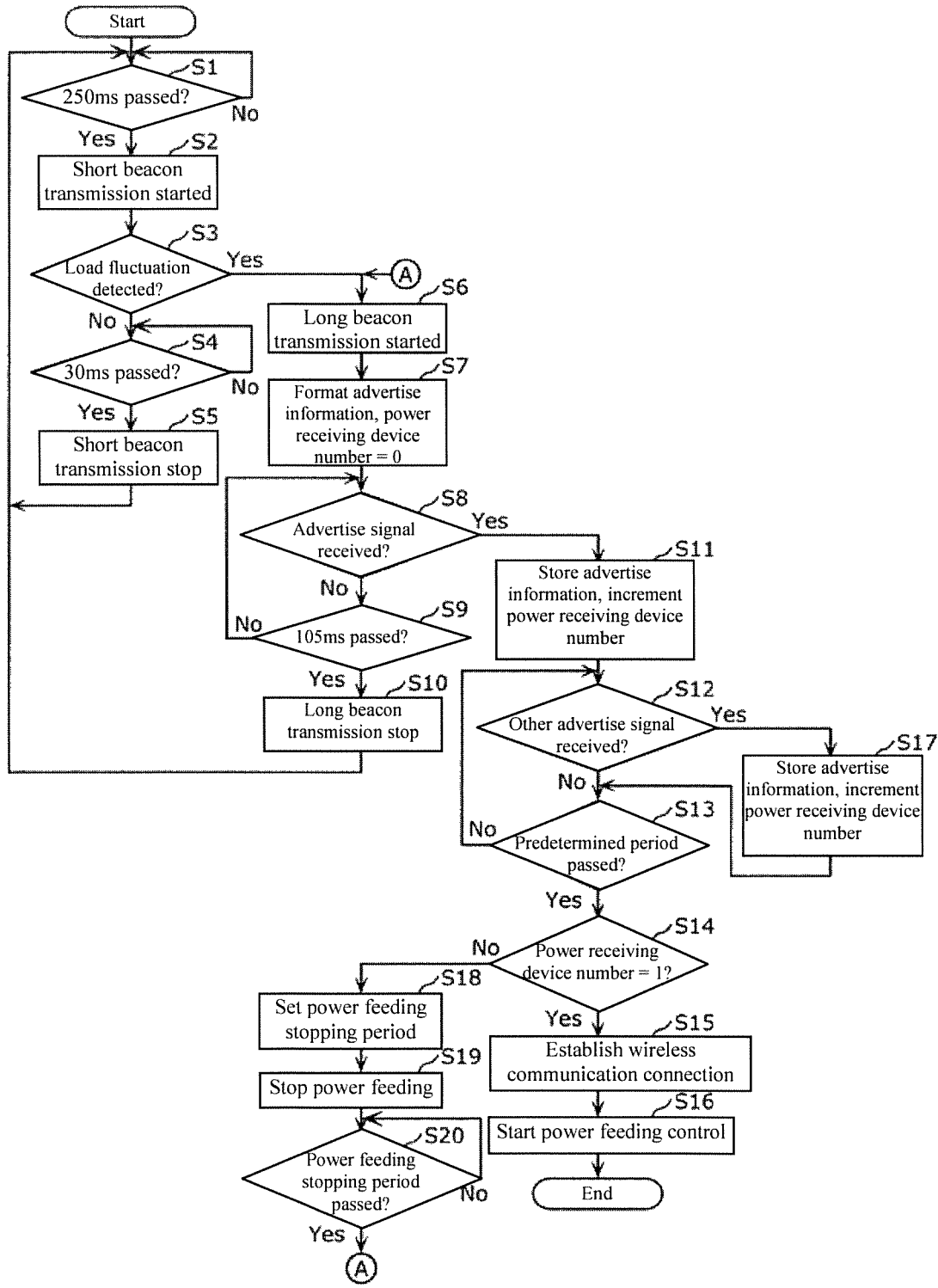
FIG. 2 is a flow chart illustrating the flow of operations of the power feeding device according to one or more embodiments of the present invention.
Figure 3:
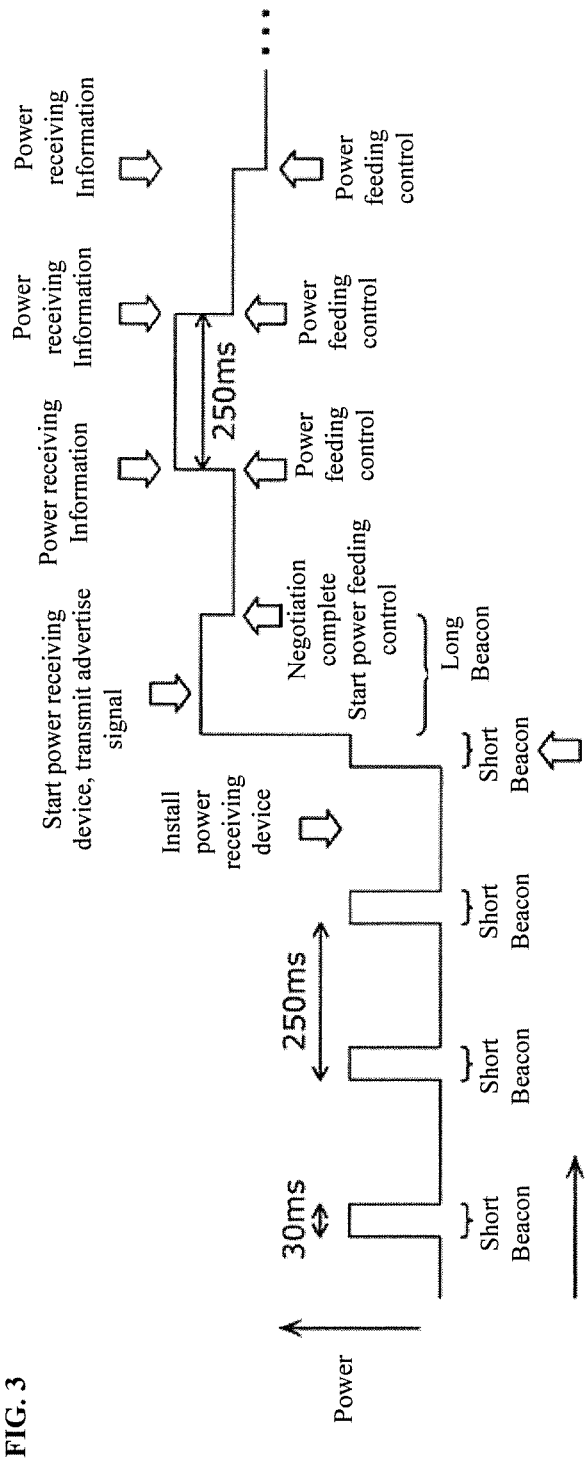
FIG. 3 is a time chart illustrating a short beacon and a long beacon transmitted from the power feeding device according to one or more embodiments of the present invention.
Figure 4A:
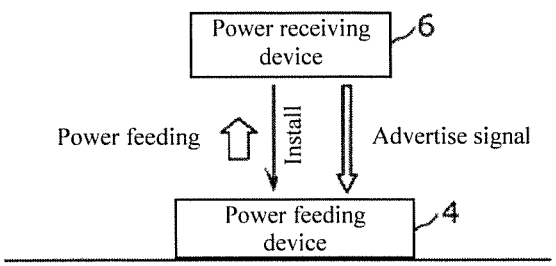
FIGS. 4A-4B are schematic diagrams for describing the operation of the power feeding device according to one or more embodiments of the present invention.
Figure 4B:
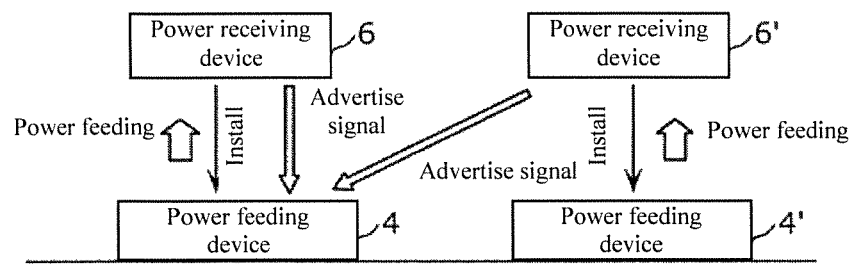

Next, the operation of the power feeding device 4 according to one or more embodiments of the present invention (power feeding method) will be described referring to FIG. 2 to FIG. 4B. FIG. 2 is a flowchart illustrating the flow of operations of the power feeding device 4 according to one or more embodiments of the present invention. FIG. 3 is a time chart illustrating a short beacon and a long beacon transmitted from the power feeding device 4 according to one or more embodiments of the present invention. FIGS. 4A-4B are schematic diagrams for describing the operation of the power feeding device 4 according to one or more embodiments of the present invention.

As illustrated in FIG. 2, first, when 250 ms passes from when the operation of the power feeding device 4 begins (YES in S1), the wireless communication device 14 of the power feeding device 4 begins transmission of a short beacon to confirm whether the power receiving device 6 is installed on or set in a power feeding space of the power feeding device 4 (S2). Here, as illustrated in FIG. 3, the short beacon is a power signal for a short period of time (for example, 30 ms) having low power, and is transmitted in cycles of, for example, 250 ms.

While the short beacon is being transmitted, the generation of load fluctuation in the power feeding device 4 is detected to confirm whether the power receiving device 6 is installed on the power feeding device 4. When the power receiving device 6 is not installed on the power feeding device 4, the generation of load fluctuation is not detected in the power feeding device 4 (NO in S3). In this case, when 30 ms passes from when the transmission of the short beacon begins (YES in S4), the wireless communication unit 14 of the power feeding device 4 stops or suspends the transmission of the short beacon (S5). After this, when 250 ms passes from when the transmission of the short beacon stops (YES in S1), step S2 is executed in the same manner as described above.

It is returned to step S3, and when the power receiving device 6 (or a foreign material other than the power receiving device 6) is installed on the power feeding device 4, the generation of load fluctuation is detected in the power feeding device 4 (YES in S3). In this case, as illustrated in FIG. 3, the wireless communication unit 14 of the power feeding device 4 switches from transmission of the short beacon to transmission of the long beacon (S6). Here, as illustrated in FIG. 3, the long beacon is a power signal for a long period of time sufficient for starting the power receiving device 6 (for example, 105 ms) having high power.

After this, the control unit 16 of the power feeding device 4 formats (deletes) advertise information stored in the memory (not illustrated in the drawings), and resets number information of the power receiving device 6 stored in the memory to "0" (S7). Note that advertise information is information included in an advertise signal (one example of a signal) transmitted from the power receiving device 6, and includes, for example, a Bluetooth (registered trademark) device address (one example of an address), an identification (ID), and a received signal strength indicator (RSSI), and the like. Furthermore, the number information of the power receiving device 6 is information relating to the number of power receiving devices 6 to which the advertise signal has been transmitted. For example, when the number information of the power receiving device 6 is "2", this means that advertise signals are transmitted having two different signal receiving devices.

In step S8, when a foreign material other than the power receiving device 6 is installed on the power feeding device 4, the wireless communication unit 14 of the power feeding device 4 does not receive an advertise signal (NO in S8). In this case, when 105 ms passes from when the transmission of the long beacon starts (YES in S9), the wireless communication unit 14 of the power feeding device 4 stops the transmission of the long beacon (S10). After this, it is returned to step S1 described above.

Returning to step S8, when the power receiving device 6 is installed on the power feeding device 4, the power receiving device 6 is started by the long beacon being received. By this, the wireless communication unit 32 of the power receiving device 6 broadcast transmits an advertise signal. When the wireless communication unit 14 of the power receiving device 4 receives an advertise signal (YES in S8), the control unit 16 of the power feeding device 4 stores advertise information included in the advertise signal to the memory, and the number information of the power receiving device 6 stored in the memory is incremented from "0" to "1" (S11).

Here, in step S12, as illustrated in FIG. 4A, a case will be described wherein there is no other power feeding device around the power feeding device 4.

Until a predetermined period of time passes (for example, 150 ms) from when the first advertise signal is received in step S8, the wireless communication unit 14 of the power feeding device 4 waits to receive another advertise signal. When a predetermined period of time passes from when the first advertise signal is received in step S8 (YES in S13) without the wireless communication unit 14 of the power feeding device 4 receiving another advertise signal (NO in S12), the number information of the power receiving device 6 is set at "1" (YES in S14).

In this case, the power feeding device 4 establishes a wireless communication connection with the power receiving device 6, which is the source of the advertise signal (S15). After this, an exchange and a negotiation of personal data is completed between the power feeding device 4 and the power receiving device 6. After this, the control unit 16 of the power feeding device 4 begins power feeding control of the power source unit 8 based on the power receiving information from the power receiving device 6 (S16). Note that, as in FIG. 3, the wireless communication unit 32 of the power receiving device 6 transmits power receiving information to the power feeding device 4 in cycles of, for example, 250 ms.

Returning to step S12, as illustrated in FIG. 4B, a case will be described wherein there is another power feeding device 4' around the power feeding device 4. In the example illustrated in FIG. 4B, the two power feeding devices 4 and 4' are arranged in a line, and two power receiving devices 6 and 6' are installed almost at the same time on the two power feeding devices 4 and 4'. At this time, the operations described above are performed in each of the two power feeding devices 4 and 4'.

In this case, the wireless communication unit 14 of the power feeding device 4 not only receives an advertise signal from the power receiving device 6, which is its pair, but also an advertise signal from the power receiving device 6', which is the pair of the other power feeding device 4' (YES in S12). After this, the control unit 16 of the power feeding device 4 stores advertise information included in the advertise signal from the power receiving device 6' to the memory, and increments the number information of the power receiving device 6 stored in the memory from "1" to "2" (S17).

Until a predetermined period of time passes from when the first advertise signal is received in step S8 (NO in S13), the determination in step S12 described above is repeatedly executed. When a predetermined period of time has passed from the receiving of the first advertise signal in step S8 (YES in S13), the number information of the power receiving device 6 stored in the memory is set at "2" (NO in S14).

After this, the control unit 16 of the power feeding device 4 sets a power feeding stopping period (one example of a predetermined period of time), which is a period of time in which the feeding of power (in other words, the transmission of the long beacon) to the power receiving device 6 is stopped (S18). For example, the control unit 16 of the power feeding device 4 generates a random number based on a Bluetooth (registered trademark) device address (6-byte numeral) assigned to the power feeding device 4. Then, the control unit 16 sets the power feeding stopping period based on this random number (for example, 100 ms). Because this random number is a number specific to the power feeding device 4, the set power feeding stopping period also becomes a time specific to the power feeding device 4. In other words, the power feeding stopping period set by the power feeding device 4 (for example, 100 ms) and the power feeding stopping period set by the power feeding device 4' (for example, 200 ms) are different times.

After this, the control unit 16 of the power feeding device 4 stops feeding power to the power receiving device 6 by controlling the power source unit 8 (S19). By this, the transmission of the advertise signal from the power receiving device 6, which is the pair of the power feeding device 4, stops. Similarly, because the feeding of power from the power feeding device 4' to the power receiving device 6' stops, the transmission of the advertise signal from the power receiving device 6', which is the pair of the power feeding device 4'.

When the power feeding stopping period passes after the feeding of power to the power receiving device 6 has stopped (YES in S20), the wireless communication device 14 of the power feeding device 4 begins feeding power to the power receiving device 6 (in other words, transmission of the long beacon) again (S6). In this case, steps S6 to S8 are executed in the same manner as described above. At this time, because the feeding of power to the power receiving device 6' begins once again in the power feeding device 4' after the power feeding device 4, the power receiving device 6' still does not start. By this, because the power receiving device 6' does not transmit an advertise signal, the wireless communication unit 14 of the power feeding device 4 only receives an advertise signal from the power receiving device 6, which is its pair (YES in S8).

After this, the control unit 16 of the power feeding device 4 stores advertise information included in the advertise signal to the memory, and increments the number information of the power receiving device 6 stored in the memory from "0" to "1" (S11).

Until a predetermined period of time passes from when the first advertise signal is received in step S8, the number information of the power receiving device 6 stored in the memory is set to "1" (YES in S14) when the power receiving device 6' still has not started (in other words when the power feeding stopping period set by the power feeding device 4' has not yet passed) (NO in S12, YES in S13).

In this case, the power feeding device 4 can establish a wireless communication connection with the power receiving device 6, which is its pair (S15). Afterward, step S16 is executed as described above.

After this, when the power receiving device 6' starts after the power feeding stopping period set by the power feeding device 4' passes, the same operations as described above are also carried out in the power feeding device 4'. By this, the power feeding device 4' can also establish a wireless communication connection in a similar manner with the power receiving device 6', which is its pair.

1-5. Effects

Next, effects achieved by the power feeding device 4 according to one or more embodiments of the present invention will be described. As described above, when, for example, two power feeding devices 4 and 4' are arranged in a line, the wireless communication unit 14 of the power feeding device 4 not only receives an advertise signal from the power receiving device 6, which is its pair (in other words, power is fed by the power feeding device 4), but also an advertise signal from the power receiving device 6', which is not its pair (in other words, power is not fed by the power feeding device 4).

In this case, the control unit 16 of the power feeding device 4 sets a power feeding stopping period which is a time specific to the power feeding device 4, and the feeding of power to the power receiving device 6 is stopped during the set power feeding stopping period. By this, the timing of starting to feed power again to the power receiving device 6 and the timing of starting to feed power again to the power receiving device 6' is different. As a result, because the power feeding device 4 only receives an advertise signal from the power receiving device 6, which is its pair, wireless communication with the power receiving device 6, which is its pair, can be correctly carried out, and the occurrence of a so-called cross-connection can be suppressed.

Therefore, the power feeding device 4 can reliably receive power receiving information from the power receiving device 6, which is its pair, and the feeding of power to the power receiving device 6 can be reliably carried out based on this power receiving information.

Figure 5:
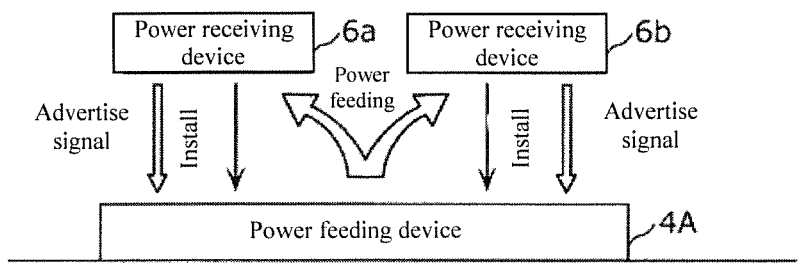
FIG. 5 is a schematic diagram for describing the operation of the power feeding device according to one or more embodiments of the present invention.
Figure 6:
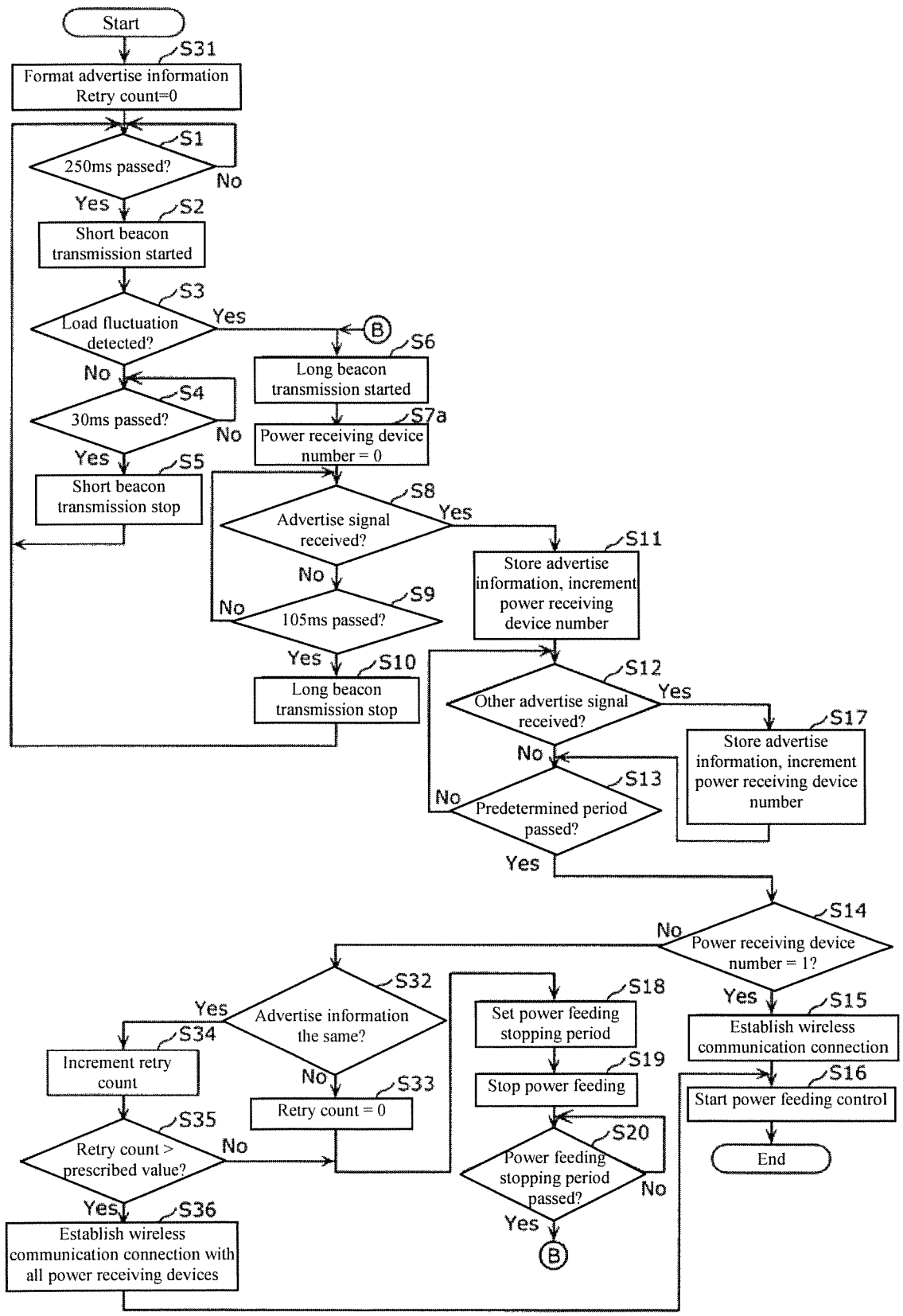
FIG. 6 is a flow chart illustrating the flow of operations of the power feeding device according to one or more embodiments of the present invention.

Next, a power feeding device 4A according to one or more embodiments of the present invention will be described referring to FIG. 5 and FIG. 6. FIG. 5 is a schematic diagram for describing the operation of the power feeding device 4A according to one or more embodiments of the present invention. FIG. 6 is a flow chart illustrating the flow of operations of the power feeding device 4A according to one or more embodiments of the present invention. Note that FIG. 1 should be appropriately referenced in regards to the reference symbols for each component in the power feeding device 4A and the power receiving devices 6a and 6b. Also, in the flowchart of FIG. 6, the same step numbers are given for the steps of the same processes in the flowchart of FIG. 2.

As illustrated in FIG. 5, a plurality of a power receiving device (for example, two devices) 6a and 6b can be installed on the power feeding device 4A according to one or more embodiments of the present invention. The power feeding device 4A can wirelessly feed power to each of the plurality of the installed power receiving device 6a and 6b at the same time.

The operation of the power feeding device 4A according to one or more embodiments of the present invention will be described referring to FIG. 6. First, the control unit 16 of the power feeding device 4A formats advertise information stored in the memory, and resets a retry count stored in the memory to "0" (S31). Note that the retry count is information indicating the number of times the stopping and restarting (the suspending and resuming) of power feeding is repeated to the power receiving devices 6a and 6b as described later.

A case will be described here wherein only one of the power receiving device 6a (or the power receiving device 6b) is installed on the power feeding device 4A. In this case, steps S1 to S16 are executed in the same manner as the aforementioned embodiments after step S31. Note that in step S7a, the control unit 16 of the power feeding device 4 is different than in step S7 of FIG. 2 described in the aforementioned embodiments in that it only carries out a process for resetting the number information of the power receiving device 6 stored in the memory to "0", and does not format advertise information stored in the memory.

Below, a case will be described wherein a plurality of the power receiving device 6a and 6b is installed on the power receiving device 4A. In this case, steps S1 to S14, and step S17 are executed in the same manner as the aforementioned embodiments after step S31. In step S14, the number information of the power receiving device 6 stored in the memory is set at "2" (NO in S14).

After this, the control unit 16 of the power feeding device 4A determines that two sets of advertise information are newly stored to the memory in each of steps S11 and S17 of this loop (NO in S32), and the retry count stored in the memory is held at "0" (S33).

After this, the control unit 16 of the power feeding device 4A sets the power feeding stopping period in the same manner as the aforementioned embodiments (S18) and stops feeding power to the power receiving devices 6a and 6b by controlling the power source unit 8 (S19). When the power feeding stopping period passes after the feeding of power to the power receiving devices 6a and 6b has stopped (YES in S20), the wireless communication device 14 of the power feeding device 4A once again begins feeding power to the power receiving devices 6a and 6b (in other words, transmission of the long beacon) (S6). After this, steps S7 to S14 are executed as described above.

After this, the control unit 16 of the power feeding device 4A determines whether the two sets of advertise information stored in the memory in each of steps S11 and S17 in this loop are the same as the two sets of advertise information stored in the memory each of steps S11 and S17 of the previous loop (S32). When the control unit 16 of the power feeding device 4A determines that they are the same (YES in S32), the retry count stored in the memory is incremented from "0" to "1" (S34).

When the retry count stored in the memory is not exceeding a prescribed value (for example, "3") (NO in S35), steps S18 to S20 and each step from S6 onward are executed as described above. In other words, the retry count stored in the memory increments only by "1" each time the stopping and restarting of the feeding of power to the power receiving devices 6a and 6b is repeated once. As described above, the stopping and restarting of the feeding of power to the power receiving devices 6a and 6b is repeated until the retry count stored in the memory exceeds a prescribed amount.

When the retry count stored in the memory exceeds a prescribed amount (YES in S35), the control unit 16 of the power feeding device 4A determines that the wireless communication unit 14 has received two of the same advertise signals each time the stopping and restarting of the feeding of power is repeated a plurality of times, and determines that the power receiving device 6a and 6b, which are the source of the two advertise signals, are all installed on the power feeding device 4A. In this case, the power feeding device 4A establishes a wireless communication connection with the power receiving devices 6a and 6b, which are the source of the two advertise signals (S36). After this, the control unit 16 of the power feeding device 4A begins power feeding control of the power source unit 8 based on the power receiving information from the power receiving units 6a and 6b (S16). Note that the control unit 16 of the power feeding device 4A sets power feeding conditions (for example, voltage value and the like) to carry out the feeding of power to each of the power receiving devices 6a and 6b based on the two advertise signals received by the wireless communication unit 14.

As described above, in one or more embodiments of the present invention, the control unit 16 of the power feeding device 4A determines that the wireless communication unit 14 has received two of the same advertise signals each time the stopping and restarting of the feeding of power is repeated a plurality of times, and determines that the plurality of the power receiving device 6a and 6b are all installed on the power feeding device 4A. By this, for example, the other power receiving device can be suppressed from determining in error that they are installed in the power feeding devices 4A based on the advertise signal from the other power receiving device (not illustrated in the drawings) installed on the other power feeding device (not illustrated in the drawings) other than the power feeding device 4A.

Figure 7:
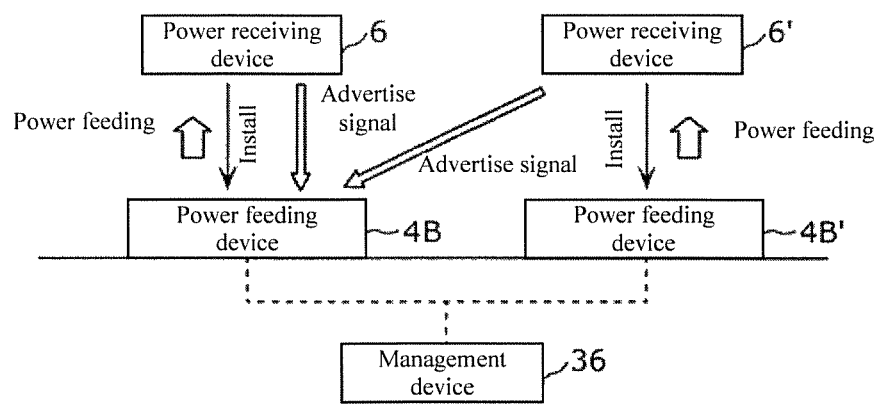
FIG. 7 is a schematic diagram for describing the operation of the power feeding device according to one or more embodiments of the present invention.
Figure 8:
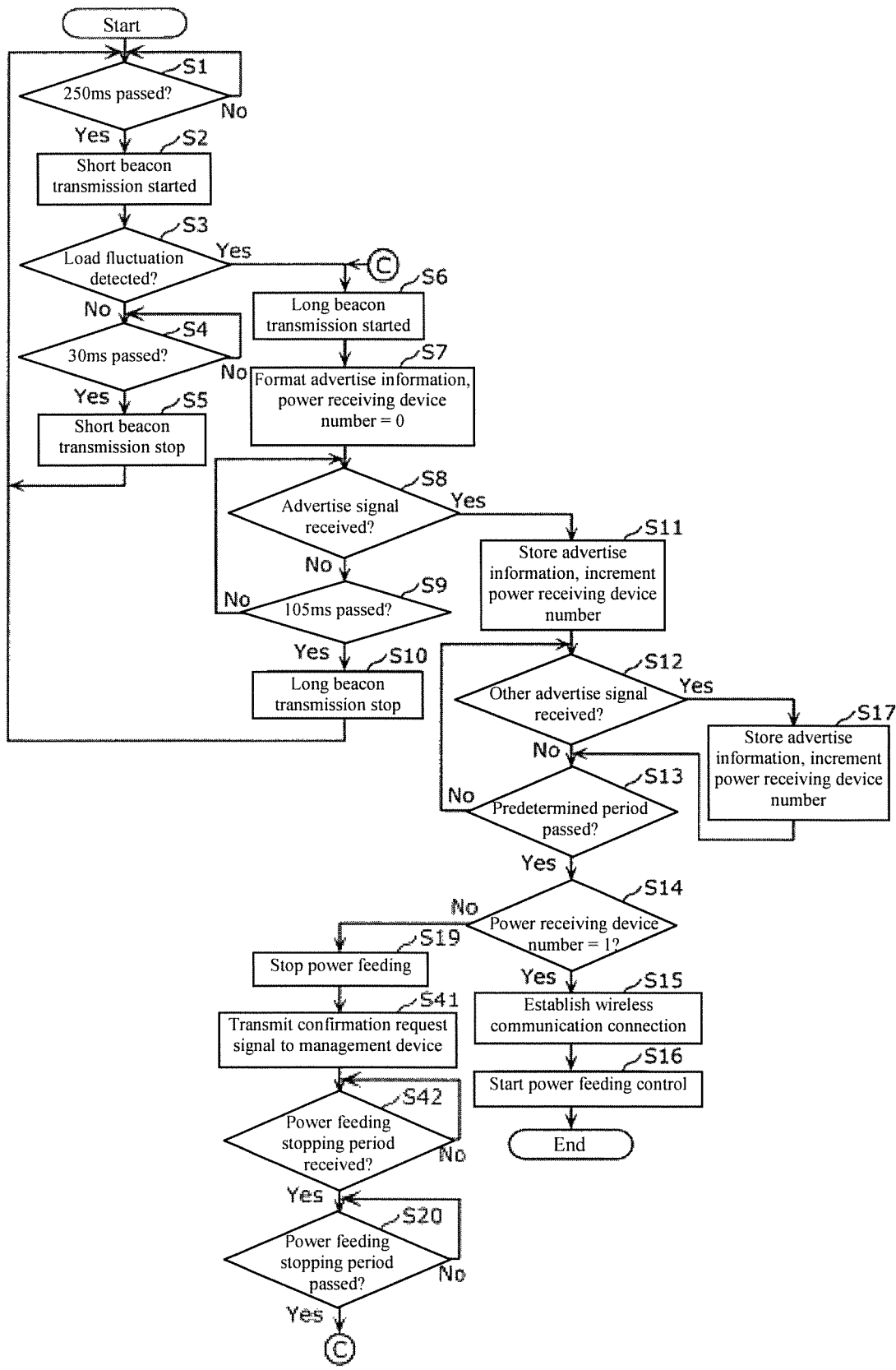
FIG. 8 is a flow chart illustrating the flow of operations of the power feeding device according to one or more embodiments of the present invention.

Next, a power feeding device 4B according to one or more embodiments of the present invention will be described referring to FIG. 7 and FIG. 8. FIG. 7 is a schematic diagram for describing the operation of the power feeding device 4B according to one or more embodiments of the present invention. FIG. 8 is a flow chart illustrating the flow of operations of the power feeding device 4B according to one or more embodiments of the present invention. Note that FIG. 1 should be appropriately referenced in regards to the reference symbols for each component in the power feeding devices 4B and 4B' and the power receiving devices 6 and 6'. Furthermore, in the flowchart of FIG. 8, the same step numbers are given for the steps of the same processes in the flowchart of FIG. 2.

As illustrated in FIG. 7, in one or more embodiments of the present invention, two power feeding devices 4B and 4B' are arranged in a line, and two power receiving devices 6 and 6' are installed almost at the same time on each of the two power feeding devices 4B and 4B'. Furthermore, a management unit 36 is disposed, which is a host computer for managing the two power feeding devices 4B and 4B'. The management unit 36 and each of the two power feeding devices 4B and 4B' can, for example, communicate via wire.

The power feeding device 4B according to one or more embodiments of the present invention will be described referring to FIG. 8. When there is no power feeding device 4B', steps S1 to S16 are executed in a similar manner to the aforementioned embodiments.

Meanwhile, when two power feeding devices 4B and 4B' are arranged in a line, steps S1 to S14 and S17 are executed in a similar manner to the aforementioned embodiments. In step S14, the number information of the power receiving device 6 stored in the memory is set at "2" (NO in S14).

After this, the control unit 16 of the power feeding device 4A stops the feeding of power to the power receiving device 6 by controlling the power source unit 8 (S19). After this, the wireless communication unit 14 of the power feeding device 4B transmits a confirmation request signal to the management device 36 (S41). The management device 36 confirms whether a confirmation request signal has been transmitted from the other power feeding device 4B' when it receives the confirmation request signal from the power feeding device 4B. In one or more embodiments of the present invention, the power feeding device 4B' also transmits a confirmation request signal to the management device 36.

After this, the management device 36 assigns a difference power feeding stopping period to each of the power feeding devices 4B and 4B' that have transmitted a confirmation request signal. After this, the management device 36 transmits (notifies) a different power feeding stopping period to each of the power feeding devices 4B and 4B', and the wireless communication unit 14 of each power feeding device 4B and 4B' receives the power feeding stopping period from the management device 36 (YES in S42). By this, the power feeding devices 4B and 4B' stop the feeding of power to the power receiving devices 6 and 6' only for the assigned power feeding stopping period (S20).

As described above, in one or more embodiments of the invention, because the management device 36 sets a power feeding stopping period, the configuration of the control unit 16 can be simplified more than in the aforementioned embodiments in which the control unit 16 sets the power feeding stopping period.

(Variations)

The power feeding devices and power feeding methods according to one or more embodiments of the present invention were described above, but the present invention is not limited to those embodiments. For example, the aforementioned embodiments may each be combined.

In each of the above embodiments, the wireless communication unit 14 of the power feeding device 4 (4A, 4B) carries out wireless communication by Bluetooth (registered trademark), but it is not limited to this, and may carry out wireless communication by, for example, Wi-Fi (registered trademark), NFC (near field communication), or the like.

In each of the above embodiments, the advertise signals included a Bluetooth (registered trademark) device address, ID, and a received signal strength indicator, but they may include at least one of these.

(Other Variations)

Furthermore, each of the devices described above may be configured as a computer system configured by a microprocessor, a ROM (Read Only Memory), RAM (Random Access Memory), a hard disk drive, a display unit, a keyboard, a mouse, and the like. Computer programs are stored on the RAM or hard disk drive. Each device achieves its function by the microprocessor operating in accordance with a computer program. A computer program here is configured by a plurality of command codes indicating instructions for the computer, to achieve a prescribed function.

Additionally, one or all components that configure each device described above may be configured by one system LSI (Large System Integration). A system LSI is a multi-functioning LSI manufactured by layering a plurality of components on one chip, and is a computer system configured including a microprocessor, a ROM, a RAM, and the like. Computer programs are stored on the RAM. The system LSI achieves its function by the microprocessor operating in accordance with a computer program.

Additionally, one or all components that configure each device may be configured by an IC card or a simple module that can be attached and removed from each device. An IC card or module is a computer system configured by a microprocessor, a ROM, a RAM, and the like. The IC card or module may include the multi-functioning LSI described above. The IC card or module achieves its function by the microprocessor operating in accordance with a computer program. This IC card or module may be tamper resistant.

Furthermore, one or more embodiments of the present invention may be a method shown above. Furthermore, one or more embodiments of the present invention may be a computer program for realizing this method using a computer, and may be a digital signal made up of a computer program.

Additionally, one or more embodiments of the present invention may record the computer program or digital signal described above onto a non-temporary recording medium such as, for example, a flexible disk, a hard disk, a CD-ROM, an MO, a DVD, a DVD-ROM, a DVD-RAM, a BD (Blu-ray (registered trademark) Disc), or a semiconductor memory. Furthermore, it may be the digital signal described above recorded on a non-temporary recording medium.

Furthermore, one or more embodiments of the present invention may transmit the computer program or digital signal described above via electric communication lines, wireless or wired communication lines, a network represented by the internet, data broadcasting, or the like.

Moreover, one or more embodiments of the present invention may be a computer system provided with a microprocessor and a memory, wherein the memory stores the computer program described above and the microprocessor operates following the computer program described above.

Moreover, it may be carried out by another independent computer system by recording and transferring the program or digital signal described above to the non-temporary recording medium, or by transferring the program or digital signal described above via the network or the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The power feeding device of one or more embodiments of the present invention can be used as, for example, a power feeding platform that feeds power wirelessly to an electronic apparatus such as a smartphone.

DESCRIPTION OF THE REFERENCE SYMBOLS

2 Wireless power feeding system
4, 4', 4A, 4B, 4B' Power feeding device
6, 6', 6a, 6b Power receiving device
8 Power source unit
10, 22 Resonance circuit
12 Power feeding coil
14, 32 Wireless communication unit
16, 34 Control unit
18 Commercial power source
20 Power receiving coil
24 Rectifier circuit
26 DC/DC converter
28 Load
30 Detection unit
36 Management device

What is claimed is:

1. A power feeding system for feeding power to a plurality of power receivers, comprising:
a first power feeding device comprising:
a first power feeder configured to wirelessly feed power to a first one of the plurality of power receivers,
a first transceiver that communicates with the plurality of power receivers, and
a first controller that controls the first power feeder; and
a second power feeding device comprising:
a second power feeder configured to wirelessly feed power to a second one of the plurality of power receivers,
a second transceiver that communicates with the plurality of power receivers, and
a second controller that controls the second power feeder;
wherein, when one of the first transceiver and the second transceiver receives communications from both the first one of the plurality of power receivers and the second one of the plurality of power receivers:
the first controller causes the first power feeder to suspend the feeding of power by the first power feeder for a first predetermined period, and
the second controller causes the second power feeder to suspend the feeding of power by the second power feeder for a second predetermined period that is longer than the first predetermined period;
wherein, upon expiration of the first predetermined period, the first controller determines which of the plurality of power receivers is the first one of the plurality of power receivers based upon a first timing of a communication received by the first transceiver and causes the first power feeder to resume feeding of power; and
wherein, upon expiration of the second predetermined period, the second controller determines which of the plurality of power receivers is the second one of the plurality of power receivers based upon a second timing of a communication received by the second transceiver and causes the second power feeder to resume feeding of power.

2. The power feeding system according to claim 1, wherein the first controller sets the first predetermined period based on a first random number specific to the first power feeding device.

3. The power feeding system according to claim 2, wherein the first controller generates the first random number based on an address assigned to the first power feeding device.

4. The power feeding system according to claim 1, wherein the communications comprise at least one of an address, an ID, and a received signal strength indicator.

5. The power feeding device system according to claim 1, wherein the first controller repeats suspending of the power feeding by the first power feeder a plurality of times when the first transceiver continues to receive communications from both the first one of the plurality of power receivers and the second one of the plurality of power receivers; and wherein the second controller repeats suspending of the power feeding by the first power feeder a plurality of times when the first transceiver continues to receive communications from both the first one of the plurality of power receivers and the second one of the plurality of power receivers.

6. The power feeding system according to claim 1, further comprising a management device that notifies the first controller of the first predetermined period and notifies the second controller of the second predetermined period.

7. The power feeding system according to claim 1,
wherein the first transceiver transmits a first beacon signal, and
wherein the communications received are responsive to the first beacon signal.

8. The power feeding system according to claim 7, wherein when load fluctuation is detected, the first transceiver transmits a second beacon signal having higher power than the first beacon signal.

9. The power feeding system according to claim 1, wherein the communications comprise advertisement signals.

10. The power feeding system according to claim 9, wherein the first controller counts a total number of the plurality of power receivers based on the advertisement signals.

11. The power feeding system according to claim 10, wherein the advertisement signals are transmitted according to a Bluetooth standard.

12. A power feeding method for feeding power to a plurality of power receivers performed by a power feeding system comprising a first power feeding device and a second power feeding device, the method comprising:

wirelessly feeding power to a first one of the plurality of power receivers by the first power feeder; and
wirelessly feeding power to a second one of the plurality of power receivers by the second power feeder,
wherein, when one of the first power feeding device and the second power feeding device receives communications from both the first one of the plurality of power receivers and the second one of the plurality of power receivers:
suspending the feeding of power by the first power feeder for a first predetermined period;
suspending the feeding of power by the second power feeder for a second predetermined period that is longer than the first predetermined period;
upon expiration of the first predetermined period, determining which of the plurality of power receivers is the first one of the plurality of power receivers based upon a first timing of a communication received by the first power feeding device and resuming feeding of power by the first power feeder; and
upon expiration of the second predetermined period, determining which of the plurality of power receivers is the second one of the plurality of power receivers based upon a second timing of a communication received by the second power feeding device and resuming feeding of power by the second power feeder.

13. The power feeding method according to claim 12, wherein the first predetermined period is set based on a random number specific to the first power feeding device.

14. The power feeding method according to claim 13, further comprising generating the random number based on an address assigned to the first power feeding device.

15. The power feeding method according to claim 12, wherein the communications comprise at least one of an address, an ID, and a received signal strength indicator.

* * * * *

UNITED STATES PATENT AND TRADEMARK OFFICE
CERTIFICATE OF CORRECTION

PATENT NO. : 10,623,062 B2
APPLICATION NO. : 15/786719
DATED : April 14, 2020
INVENTOR(S) : Takafumi Nakase Page 1 of 1

It is certified that error appears in the above-identified patent and that said Letters Patent is hereby corrected as shown below:

In the Claims

At Column 14, Claim number 5, Line number 64, the word "The Power feeding device system" should read -- The Power feeding system --.

Signed and Sealed this
Thirtieth Day of June, 2020

Andrei Iancu
*Director of the United States Patent and Trademark Office*